US009422860B2

(12) United States Patent
Polkus et al.

(10) Patent No.: US 9,422,860 B2
(45) Date of Patent: Aug. 23, 2016

(54) METHODS AND SYSTEM FOR ENGINE OPERATION DURING DEGRADATION OF A TWO-STAGE TURBOCHARGER

(75) Inventors: Greg Thomas Polkus, Waukesha, WI (US); Daniel Edward Loringer, Lawrence Park, PA (US); James Robert Mischler, Lawrence Park, PA (US); Neil Xavier Blythe, Lawrence Park, PA (US); Luke Henry, Lawrence Park, PA (US); Matthew John Malone, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 997 days.

(21) Appl. No.: 13/598,660

(22) Filed: Aug. 30, 2012

(65) Prior Publication Data
US 2014/0067228 A1  Mar. 6, 2014

(51) Int. Cl.
F02B 37/007 (2006.01)
F02B 39/16 (2006.01)
F02B 37/14 (2006.01)
F02B 37/16 (2006.01)
F02B 37/013 (2006.01)
F02D 41/22 (2006.01)
F02B 37/00 (2006.01)
F02B 37/18 (2006.01)
F02D 41/00 (2006.01)
F02B 37/12 (2006.01)

(52) U.S. Cl.
CPC .............. *F02B 39/16* (2013.01); *F02B 37/004* (2013.01); *F02B 37/007* (2013.01); *F02B 37/013* (2013.01); *F02B 37/14* (2013.01); *F02B 37/16* (2013.01); *F02B 37/18* (2013.01); *F02D 41/005* (2013.01); *F02D 41/0007* (2013.01); *F02D 41/221* (2013.01); *F02B 37/127* (2013.01); *F02B 2037/122* (2013.01); *F02D 2041/227* (2013.01); *Y02T 10/144* (2013.01); *Y02T 10/47* (2013.01)

(58) Field of Classification Search
CPC ...... F02B 37/007; F02B 37/013; F02B 37/12; F02B 37/127; F02B 37/14; F02B 37/16; F02B 2037/122; F02B 2037/125; F02B 2037/162; F02B 2037/164; F02B 2037/166; F02B 2037/168; F02B 39/16; F02B 2039/162; F02B 2039/164; F02B 2039/166; F02B 2039/168
See application file for complete search history.

(56) References Cited

U.S. PATENT DOCUMENTS

| 5,199,261 | A  | * | 4/1993  | Baker     | F02B 37/013 60/602 |
| 5,845,495 | A  | * | 12/1998 | Schray    | F02B 37/007 60/612 |
| 8,001,782 | B2 | * | 8/2011  | Pursifull | F02B 37/007 123/562 |
| 2007/0283695 | A1 | | 12/2007 | Figura | |
| 2009/0064677 | A1 | * | 3/2009 | Farmer | F02B 37/007 60/600 |
| 2009/0107140 | A1 | * | 4/2009 | Pursifull | B60W 10/10 60/600 |
| 2011/0154892 | A1 | * | 6/2011 | Ibuki | F02B 37/013 73/114.79 |
| 2011/0167816 | A1 | * | 7/2011 | Tomita | F02B 37/004 60/602 |
| 2012/0089314 | A1 | | 4/2012 | Nistler et al. | |
| 2012/0191321 | A1 | * | 7/2012 | Ibuki | F02B 37/004 701/102 |
| 2012/0210711 | A1 | * | 8/2012 | Petrovic | F02B 37/013 60/602 |
| 2014/0230530 | A1 | * | 8/2014 | Fontvieille | F02D 41/221 73/114.13 |

* cited by examiner

Primary Examiner — Erick Solis
(74) Attorney, Agent, or Firm — GE Global Patent Operation

(57) ABSTRACT

Various methods and systems are provided for engine operation with a degraded turbocharger. In one embodiment, a method for an engine comprises reducing mass flow through a first turbocharger while continuing engine operation and adjusting operation of a second turbocharger in response to detected degradation of the first turbocharger.

23 Claims, 6 Drawing Sheets

METHODS AND SYSTEM FOR ENGINE OPERATION DURING DEGRADATION OF A TWO-STAGE TURBOCHARGER

FIELD

Embodiments of the subject matter disclosed herein relate to an engine, engine components, and an engine system, for example.

BACKGROUND

Turbocharger degradation may result in damage to an engine if the engine continues to operate after the degradation has occurred. Additionally, continued engine operation with a degraded turbocharger may further degrade the turbocharger. As such, engines are typically controlled to be shut down in response to detected turbocharger degradation. However, in some conditions, the degradation may not be severe enough to damage the engine, resulting in unnecessary engine shutdowns.

BRIEF DESCRIPTION

In one embodiment, a method for an engine comprises reducing mass flow through a first turbocharger while continuing engine operation and adjusting operation of a second turbocharger in response to detected degradation of the first turbocharger.

In this way, engine operation may be continued even in the presence of turbocharger degradation. The load on the second turbocharger may be increased and system mass flow may be reduced to decrease the load on the first turbocharger. In doing so, engine shutdown may be avoided. Additionally, by shifting the load away from the degraded turbocharger, further degradation to the turbocharger may be reduced.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of detecting turbocharger degradation, and if degradation is indicated, maintaining engine operation with a degraded turbocharger. When turbocharger degradation is detected, engines are typically configured to be shut down in order to avoid further damage to the turbocharger, engine, or other vehicle components. However, particularly if the engine is installed in a rail vehicle, unanticipated engine shutdown may be burdensome and/or pose a risk of collisions with other vehicles. Thus, it may be beneficial to maintain engine operation until the vehicle is at a safe location or until the vehicle is serviceable. According to embodiments disclosed herein, if degradation of a first turbocharger is detected, the load placed on the degraded turbocharger may be reduced by decreasing air flow through the degraded turbocharger. For example, the load on the first turbocharger may be transferred to a second turbocharger. Additionally, if the detected degradation is too severe to safely maintain engine operation, the engine may be shut down.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example mobile platform supporting a system incorporating an embodiment of the invention.

Figure 1:
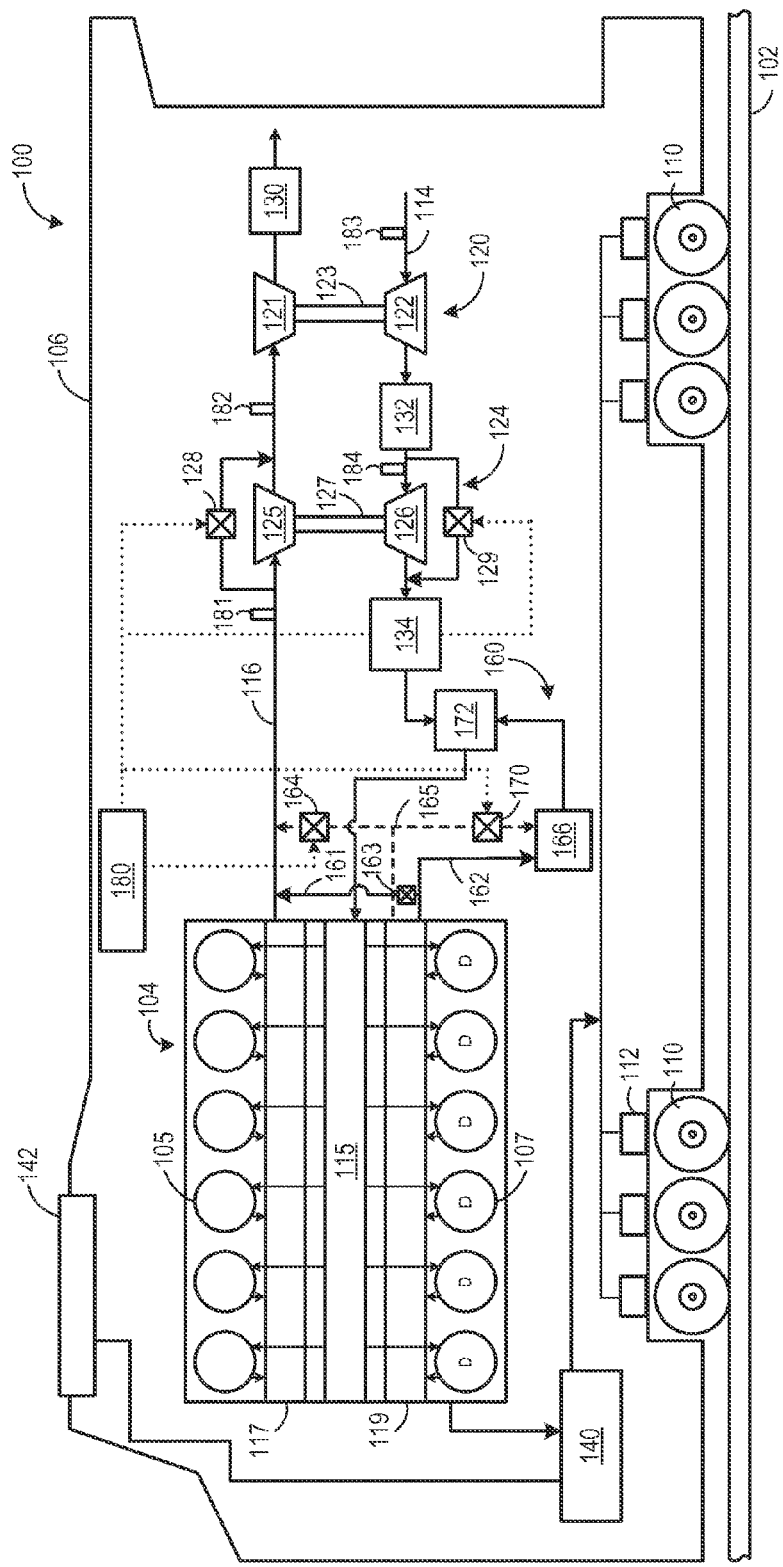
FIG. 1 shows a schematic diagram of an embodiment of a rail vehicle with an engine according to an embodiment of the invention.

Before further discussion of the turbocharger degradation identification approach, an example of a platform is disclosed in which the turbocharger system may be configured for an engine in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Additionally, in some embodiments, the EGR system 160 may include an EGR bypass passage 161 that is configured to divert exhaust from the donor cylinders back to the exhaust passage. The EGR bypass passage 161 may be controlled via a valve 163. The valve 163 may be configured with a plurality of restriction points such that a variable amount of exhaust is routed to the exhaust, in order to provide a variable amount of EGR to the intake.

In an alternate embodiment shown in FIG. 1, the donor cylinders 107 may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler 166 and/or additional elements prior to being routed to the intake passage 114.

Further, the alternate EGR system includes a first valve 164 disposed between the exhaust passage 116 and the alternate EGR passage 165. The second valve 170 may be an on/off valve controlled by the control unit 180 (for turning the flow of EGR on or off), or it may control a variable amount of EGR, for example. In some examples, the first valve 164 may be actuated such that an EGR amount is reduced (exhaust gas flows from the EGR passage 165 to the exhaust passage 116). In other examples, the first valve 164 may be actuated such that the EGR amount is increased (e.g., exhaust gas flows from the exhaust passage 116 to the EGR passage 165). In some embodiments, the alternate EGR system may include a plurality of EGR valves or other flow control elements to control the amount of EGR.

In such a configuration, the first valve 164 is operable to route exhaust from the donor cylinders to the exhaust passage 116 of the engine 104 and the second valve 170 is operable to route exhaust from the donor cylinders to the intake passage 114 of the engine 104. As such, the first valve 164 may be referred to as an EGR bypass valve, while the second valve 170 may be referred to as an EGR metering valve. In the embodiment shown in FIG. 1, the first valve 164 and the second valve 170 may be engine oil, or hydraulically, actuated valves, for example, with a shuttle valve (not shown) to modulate the engine oil. In some examples, the valves may be actuated such that one of the first and second valves 164 and 170 is normally open and the other is normally closed. In other examples, the first and second valves 164 and 170 may be pneumatic valves, electric valves, or another suitable valve.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the vehicle system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

As depicted in FIG. 1, the vehicle system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The first turbocharger may be referred to the "low-pressure stage" of the turbocharger. The second turbocharger 124 operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger 124 is provided with a turbine bypass valve 128 which allows exhaust gas to bypass the second turbocharger 124. The turbine bypass valve 128 may be opened, for example, to divert the exhaust gas flow away from the second turbine 125. In this manner, the rotating speed of the compressors 126, and thus the boost provided by the turbochargers 120, 124 to the engine 104 may be regulated during steady state conditions. Additionally, the first turbocharger 120 may also be provided with a turbine bypass valve. In other embodiments, only the first turbocharger 120 may be provided with a turbine bypass valve, or only the second turbocharger 124 may be provided with a turbine bypass valve. Additionally, the second turbocharger may be provided with a compressor bypass valve 129, which allows gas to bypass the second compressor 126 to avoid compressor surge, for example. In some embodiments, first turbocharger 120 may also be provided with a compressor bypass valve, while in other embodiments, only first turbocharger 120 may be provided with a compressor bypass valve.

The vehicle system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system 100 further includes the control unit 180, which is provided and configured to control various components related to the vehicle system 100. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Correspondingly, the control unit 180 may control the vehicle system 100 by sending commands to various components such as traction motors, alternator, cylinder valves, throttle, heat exchangers, wastegates or other valves or flow control elements, etc.

Figure 2:
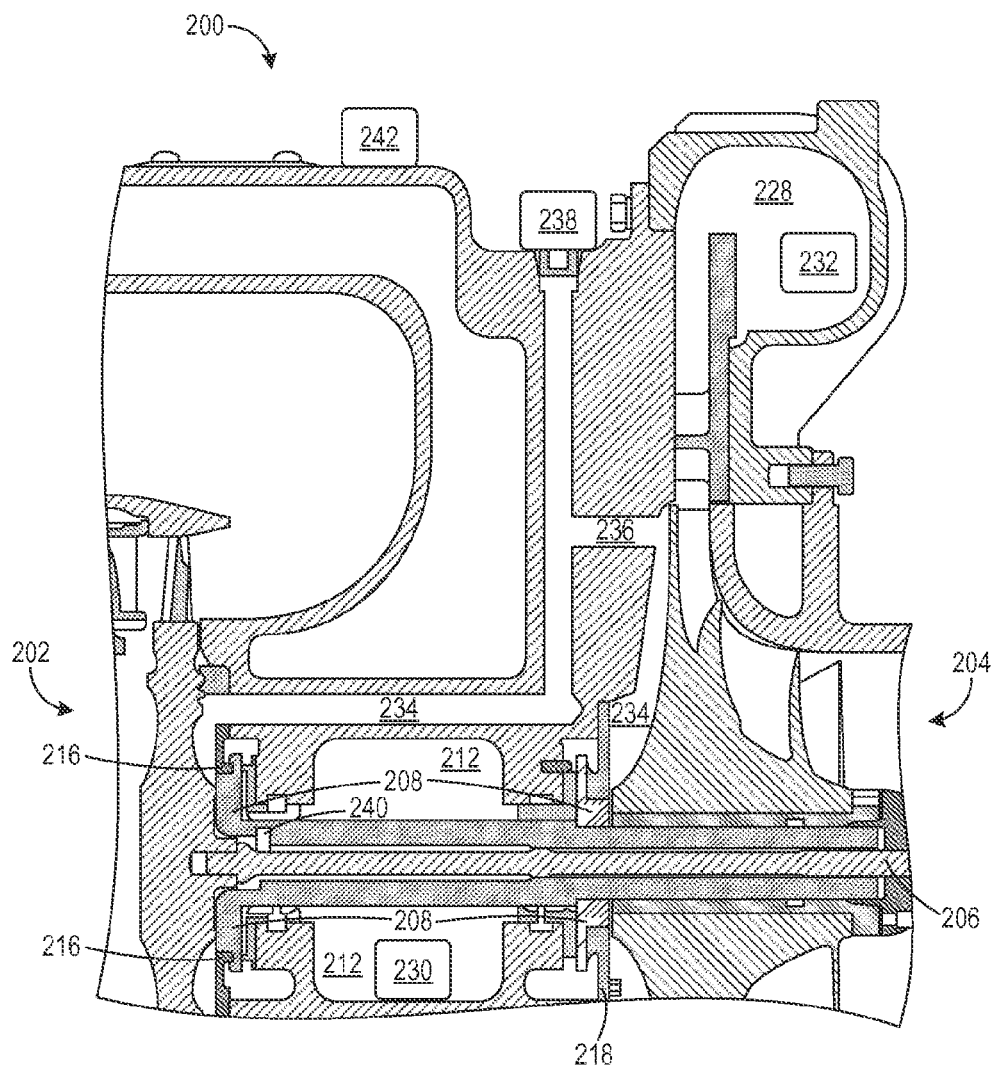
FIG. 2 schematically shows a portion of a cross-sectional view of a turbocharger according to an embodiment of the invention.

FIG. 2 shows a view of an embodiment of a turbocharger 200 that may be coupled to an engine, such as turbocharger 120 or turbocharger 124 described above with reference to FIG. 1. The view shown in FIG. 2 is a cross-sectional view of a portion of the turbocharger 200. In one example, turbocharger 200 may be bolted to the engine. In another example, the turbocharger 200 may be coupled between the exhaust passage and the intake passage of the engine. In other examples, the turbocharger may be coupled to the engine by another suitable manner.

The turbocharger 200 includes a turbine 202 and a compressor 204. Exhaust gases from the engine pass through the turbine 202, and energy from the exhaust gases is converted into rotational kinetic energy to rotate a shaft 206 which, in turn, drives the compressor 204. Ambient intake air is compressed (e.g., pressure of the air is increased) as it is drawn through the rotating compressor 204 such that a greater mass of air may be delivered to the cylinders of the engine.

In some embodiments, the turbine 202 and the compressor 204 may have separate casings which are bolted together, for example, such that a single unit (e.g., turbocharger 200) is formed. As an example, the turbine may have a casing made of cast iron and the compressor may have a casing made of an aluminum alloy. In other examples, casings of the turbine and the compressor may be made of the same material. It should be understood the turbine casing and the compressor casing may be made of any suitable materials.

The turbocharger 200 may include a variety of sensors that may detect various types of turbocharger degradation. For example, the turbocharger degradation may include an out-of-balance rotor assembly, loss of oil pressure or flow (referred to as oil starvation), thrust bearing failure, or a cracked turbine casing. Each type of degradation may be detected by one or more sensors, as described below.

As depicted in FIG. 2, a first pressure sensor 232 is positioned at a diffuser 228 in the compressor casing to measure a pressure in the compressor casing. The diffuser 228 is a divergent duct in the compressor casing which converts velocity energy to pressure energy, for example. The pressure sensor 232 may be a transducer, for example, which generates a signal as a function of the pressure imposed. The pressure at the diffuser 228 may be substantially equal to the intake manifold air pressure (MAP).

The turbocharger 200 further includes bearings 208 to support the shaft 206, such that the shaft may rotate at a high speed with reduced friction. The turbocharger may further include a lubrication system to reduce degradation of the bearings and to maintain a temperature of the bearings (e.g., to keep the bearings cool). While the engine is in operation, a constant flow of engine oil or engine coolant may pass through the turbocharger, for example. In one example, pressurized engine oil may enter the turbocharger via an oil inlet (not shown). Excess oil may collect in an oil cavity 212, and the oil leaves the turbocharger 200 through an outlet (not shown) fluidly coupled with the oil cavity 212. As depicted in FIG. 2, an oil cavity pressure sensor 230 is positioned in the oil cavity 212 to measure a pressure in the oil cavity. The oil cavity pressure sensor 230 may be in addition to the first pressure sensor 232, or it may be alternative thereto. The oil cavity pressure sensor 230 may be a transducer, for example, which generates a signal as a function of the pressure imposed. The oil cavity pressure sensor 230 may be used to detect an out-of-balance rotor assembly or oil starvation, for example.

As depicted in FIG. 2, the turbocharger 200 further includes two non-contact seals (e.g., labyrinth seals), a turbine labyrinth seal 216 positioned between the oil cavity 212 and the turbine 202 and a compressor labyrinth seal 218 positioned between the oil cavity 212 and the compressor 204. A labyrinth seal as used herein refers to a type of mechanical seal that provides a tortuous or serpentine path to help prevent leakage. (As opposed to, for example, an O-ring or similar circular seal.) In one embodiment, the labyrinth seal may be composed of many grooves or threads that press tightly against another component. Herein, the labyrinth seal is applied to a rotating shaft system, with a small clearance between tips of the labyrinth threads and the running surface. In this way, the labyrinth seal provides non-contact sealing action by controlling the passage of fluid. The labyrinth seals 216 and 218 may thus reduce leakage of the engine oil used to lubricate the bearings 208 to the turbine 202 and the compressor 204, for example, by providing a contorted, tortuous path. Because the labyrinth seals 216 and 218 are non-contact seals, friction around the bearings 208 and the shaft 206 may be reduced, while oil leakage is also reduced. In one example, the labyrinth seals 216 and 218 may be spaced a determined distance from the bearings 208.

The turbocharger 200 further includes a seal cavity 234 that extends from behind the compressor 204 near the compressor labyrinth seal 218 to an area near the turbine labyrinth seal 216. The seal cavity 234 is an air passage in the casing of the turbocharger 200. As shown in FIG. 2, the seal cavity 234 includes an orifice 236. The orifice is configured to generate a choked air flow. In such a configuration, the choked airflow may generate a greater pressure difference further downstream resulting in better detection of differences in pressure between various locations in the turbocharger 200. The seal cavity 234 further includes a second pressure sensor 238 to measure a pressure in the seal cavity 234. As depicted in FIG. 2, the second pressure sensor 238 is located at a port of the seal cavity 234. The second pressure sensor 238 may be a transducer, for example, which generates a signal as a function of the pressure imposed. The pressure in the seal cavity 234 may be higher than the pressure in the oil cavity 212, for example, such that oil may be retained in the oil cavity.

Each pressure sensor location may have a different pressure. For example, the pressure at the diffuser 228 in the compressor casing may be higher than the pressure in the seal cavity 234, and the pressure in the seal cavity 234 may be higher than the pressure in the oil cavity 212. Further, the differences between each pressure may change with operating conditions such as turbine or compressor speed, load of the engine, ambient temperature and/or pressure, and the like. When degradation of the turbine labyrinth seal 216 and/or the compressor labyrinth seal 218 occurs due to the shaft 206 rubbing the seals because of rotor imbalance or axial shifts, pressure in the seal cavity 234 may decrease, while the pressure at the diffuser 228 in the compressor casing remains substantially the same. As such, degradation of the labyrinth seals 216 and 218 may be diagnosed based on a pressure difference between a pressure measured in the seal cavity 234 and a pressure measured at the diffuser 228 in the compressor casing greater than respective threshold differences.

Degradation of the turbocharger labyrinth seals or bearings may be detected based on other parameters. For example, the turbocharger bearing housing may be pressurized (e.g., with a fluid), and the crankcase pressure monitored. If the crankcase pressure does not respond as expected (for example, if it does not increase), seal or bearing degradation may be indicated. In another example, the bearing temperature or oil supply pressure may be measured, and if the temperature or oil pressure is different than expected, degradation may be indicated. Additionally or alternatively, seal or bearing damage may be indicated if the turbocharger is rotating at a speed below a threshold (for example, if the turbocharger shaft is not rotating, degradation may be indicated).

Furthermore, one or more sensors may be mounted to the turbocharger in order to detect an out-of-balance rotating assembly, which may result in damage to the turbocharger and/or additional engine components. In one example, a speed sensor 240 may be used to detect an out-of-balance rotating assembly. For example, a toothed wheel on the turbocharger rotating assembly may pass sensor 240, creating a sinusoidal speed signal. The amplitude of the resulting sinusoidal wave is a function of the sensor gap to the toothed wheel. If the rotating assembly becomes out-of-balance, the distance between the sensor 240 and toothed wheel changes, which may be detected in the amplitude of the sinusoidal output. The amplitude of the sinusoidal output may be compared to a predetermined range of output for the sensor during operation without turbocharger degradation in order to determine if the turbocharger is operating with an out-of-balance rotating assembly. The speed sensor may also be used to detect thrust bearing failure.

In another example, an accelerometer 242 may be mounted to the turbocharger or supporting equipment. The accelerometer may detect changes in vibration of the turbocharger, which may indicate that the rotating assembly is out of balance. Additional mechanisms for detecting an out-of-balance rotating assembly include identification of an oil pressure harmonic indicative of degradation in the rotating assembly oil pressure signal and/or detection of a loss of electrical potential of a sacrificial wire, which may indicate that one or more fragments of the rotating assembly are in contact with a shroud of the turbine or the compressor.

Additionally, a cracked turbine casing may be detected based on a change in water or coolant pressure in a cooling jacket of the turbocharger. A pressure sensor may be located in a water jacket, and a decrease in pressure may indicate that the turbine casing is cracked.

Thus, based on feedback from one or more sensors, degradation of a turbocharger may be indicated. In an engine with a two-stage turbocharger system (such as a system with a high-pressure turbocharger and a low-pressure turbocharger), each turbocharger may monitored for degradation. If degradation is indicated in one of the turbochargers, the load on the degraded turbocharger may be reduced, for example by placing the non-degraded turbocharger under a higher load. By doing so, engine operation may be continued even with a degraded turbocharger.

Figure 3:
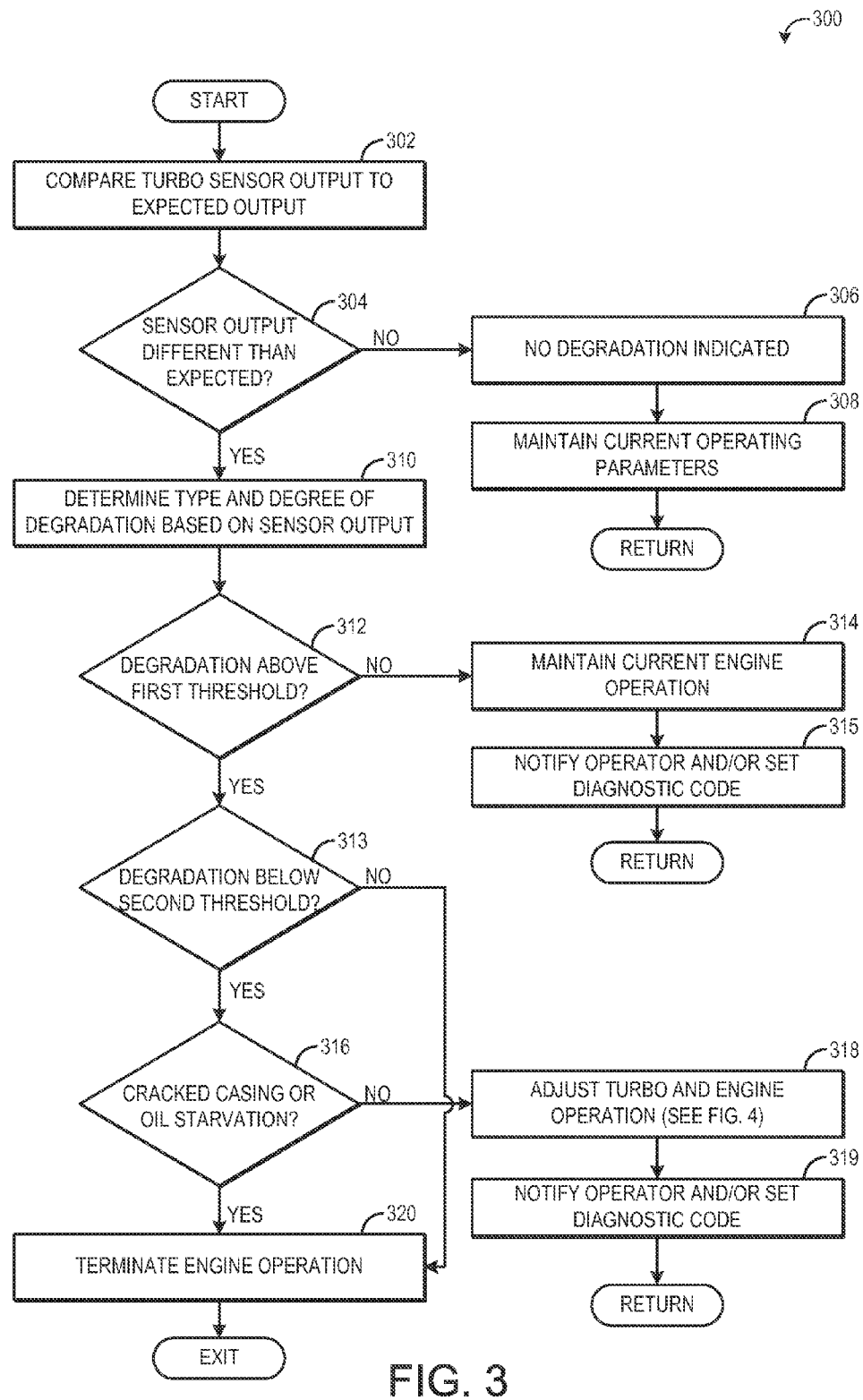
FIG. 3 is a flow chart illustrating a method for detecting turbocharger degradation according to an embodiment of the invention.

FIG. 3 illustrates a method 300 for detecting degradation of a turbocharger. Method 300 may be carried out by a control unit, such as control unit 180, according to instructions stored thereon. The turbocharger may be included in a two-stage turbocharger system comprising two turbochargers arranged in series, or in another suitable turbocharger arrangement.

Method 300 comprises, at 302, comparing measured turbocharger sensor output to expected sensor output. As explained above with respect to FIG. 2, the turbocharger may include one or more sensors that may be utilized to determine if degradation of the turbocharger is present. For example, a turbocharger speed sensor output may be compared to an expected speed output to detect rotor assembly or thrust bearing failure, oil pressure sensor output may be compared to expected oil pressure to detect oil starvation of the turbocharger, and other sensors in the turbocharger may be monitored. Sensors not included in the turbocharger may also be utilized to detect turbocharger degradation, such as a crankcase pressure sensor, manifold air pressure sensor, etc. The output from the turbocharger sensors may be compared to expected output, for example average output of previous engine operations or other suitable expected outputs.

At 304, it is determined if the measured sensor output is different from the expected sensor output. If the sensor output is not different from the expected output, method 300 proceeds to 306 to indicate no turbocharger degradation. At 308, current engine operating parameters are maintained (e.g., engine speed and load, air flow through each turbocharger, EGR rate, etc.).

If the measured sensor output is different from the expected output, method 300 proceeds to 310 to determine the type and degree of turbocharger degradation. The type and degree of turbocharger degradation may be determined from the sensor output. For example, the sensor that output the unexpected signal may indicate which type of degradation is present (if the unexpected output originated from the speed sensor or the oil sensor, for example), and the magnitude of the difference between the sensor output and the expected output may indicate the degree of the degradation.

At 312, it is determined if the degree of the degradation is above a threshold. For each type of degradation, a threshold difference between the expected output and the actual output may be tolerated. Each type of degradation may have a different degradation threshold. In one example, the threshold for the out of balance rotor assembly may be larger than the threshold for the oil starvation, for example a 10% difference between the expected and measured output may be tolerated for an out of balance rotor assembly, while only a 5% difference may be tolerated for the oil starvation. In other embodiments, each type of degradation may have an equal threshold, such as 10% difference between the respective actual and expected sensor output.

If the degree of the degradation is not above the threshold, method 300 proceeds to 314 to maintain current engine operating parameters. At 315, an operator of the vehicle may be notified of the detected degradation, and/or a diagnostic code may be set. In this way, the detected degradation may be addressed by a vehicle operator or during service of the engine before significant degradation occurs.

If the degree of the degradation is above the threshold, method 300 proceeds to 313 to determine if the degree of degradation is below a second threshold. The second threshold may be higher than the first threshold, for example the second threshold may be a difference of 50% between the measured and expected sensor output. However, any threshold difference may be used. If the degree of degradation is not below the second threshold, the amount of degradation to the turbocharger may be too severe to continue safe operation of the turbocharger, and hence method 300 proceeds to 320 to terminate the engine operation. If the degree of degradation is below the second threshold, method 300 proceeds to 316 to determine if the degradation is a cracked turbine casing or oil starvation. The cracked turbine casing and the oil starvation are of relatively higher severity than the out of balance rotor assembly or thrust bearing failure, and continued operation of the turbocharger, even under low loads, may not be possible. Thus, if the degradation is a cracked casing or oil starvation, method 300 proceeds to 320 to terminate engine operation, and then method 300 exits.

However, if the degradation is not a cracked casing or oil starvation (for example, if it is an out of balance rotor assembly or thrust bearing failure), method 300 proceeds to 318 to adjust turbocharger and engine operation, thus providing for continued engine operation in the presence of the turbocharger degradation. Additional information regarding the engine and turbocharger operation with the degraded turbocharger is described below with respect to FIG. 4. At 319, the vehicle operator is notified of the degradation and/or diagnostic code is set. Method 300 then returns.

Figure 4:
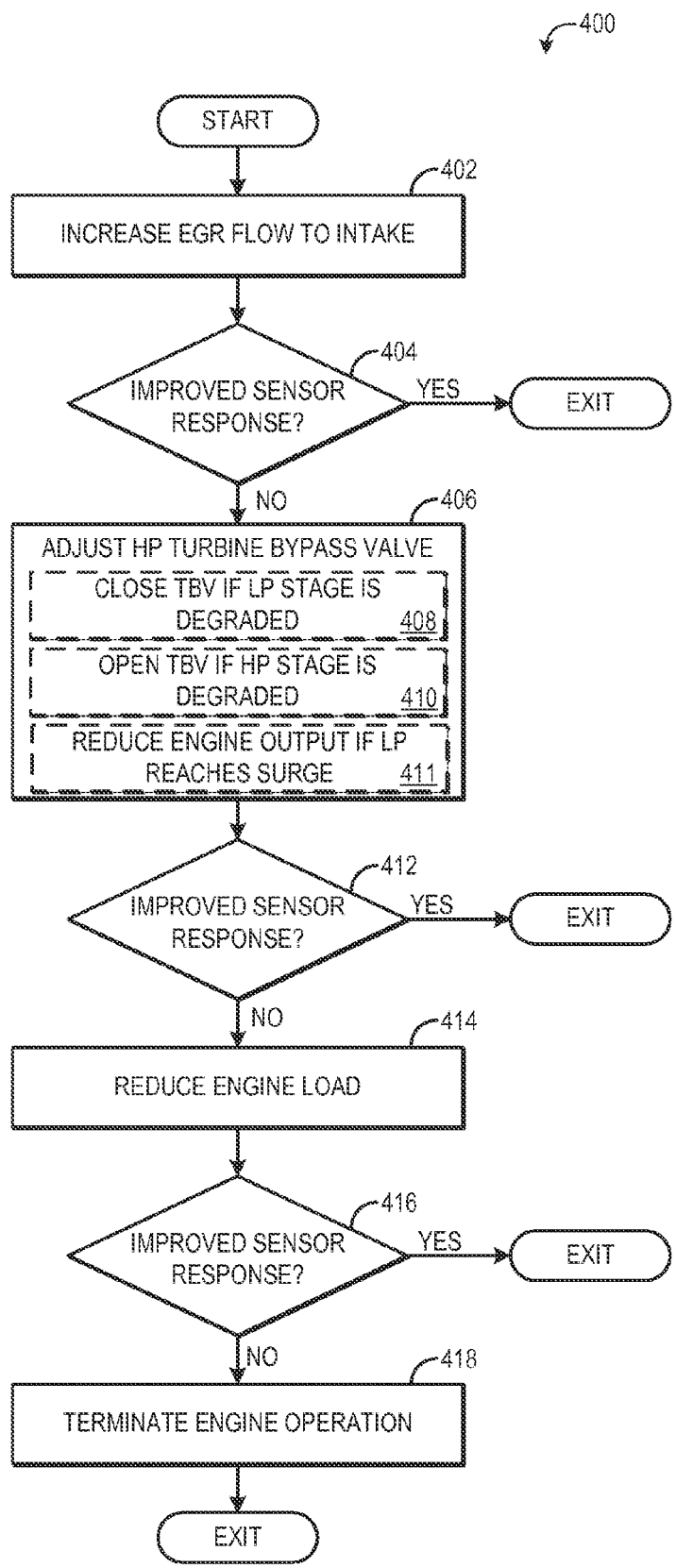
FIG. 4 is a flow chart illustrating a method for reducing load on a degraded turbocharger according to an embodiment of the invention.

FIG. 4 is a flow chart illustrating a method 400 for adjusting engine operation in response to a degraded turbocharger. Method 400 may be carried out by control unit 180 when turbocharger degradation is detected. In one example, method 400 may be carried out when an out of balance rotor assembly or thrust bearing failure is detected. The engine operation and turbocharger operation adjustments performed in method 400 reduce the air flow directed through the degraded turbocharger, allowing for continued engine operation.

Method 400 includes, at 402, increasing EGR flow to the intake. By increasing the EGR flow to the intake, less exhaust may be directed through the turbocharger, thus reducing the load on both the first, low-pressure turbocharger and the second, high-pressure turbocharger. At 404, it is determined if an improvement in the sensor response is detected. The reduced system mass flow caused by the increased EGR flow may reduce the impact of the out of balance rotor assembly, for example, bringing the actual output from the turbocharger sensor used to detect to the degradation closer to the expected output. If the current sensor output has improved from the increase in EGR flow, for example if the current sensor output is within a threshold range of the expected output, further corrective action is not indicated, and method 400 exits.

If improvement in the sensor response is not detected, method 400 proceeds to 406 to adjust the turbine bypass valve of the high-pressure turbocharger. The adjustment to the HP turbine bypass valve is dependent on which turbocharger is degraded. If the low-pressure turbocharger is degraded, the HP turbine bypass valve is closed to increase the load on the high-pressure turbocharger, as indicated at 408. The speed limit of the high-pressure turbocharger may be increased in order to provide the desired flow through the high-pressure turbocharger to maintain vehicle power.

If the high-pressure turbocharger is degraded, the HP turbine bypass valve is opened to increase the load on the low-pressure turbocharger, as indicated at 410. This may include reducing engine air-fuel ratio, in order to account for the decreased intake air compression resulting from the bypass of the high-pressure turbocharger.

The above corrective actions may push the low-pressure turbocharger into surge operation. Surge occurs in conditions of low mass flow, and may cause noise disturbances and component degradation. When the EGR rate is increased, less air flow is directed through the low-pressure turbocharger, potentially resulting in surge. Additionally, when the HP turbine bypass valve is opened, the low-pressure turbocharger may be pushed towards operation in the surge region. To prevent surge of the low-pressure turbocharger, engine output may be reduced, as indicated at 411.

At 412, it is determined if the sensor response has improved subsequent to the EGR flow increase and adjustment to the HP turbine bypass valve. If the response has improved, method 400 exits. If the response has not improved (or has not improved enough), method 400 proceeds to 414 to reduce the load on the engine, which will reduce overall system mass flow through the turbochargers. At 416, the sensor response improvement is again determined, and if the sensor response has improved, method 400 exits. If the sensor response has not improved, the above corrective actions are not sufficient to enable continued operation of the engine with the degraded turbocharger, and thus method 400 proceeds to 418 to terminate engine operation.

Figure 5A:
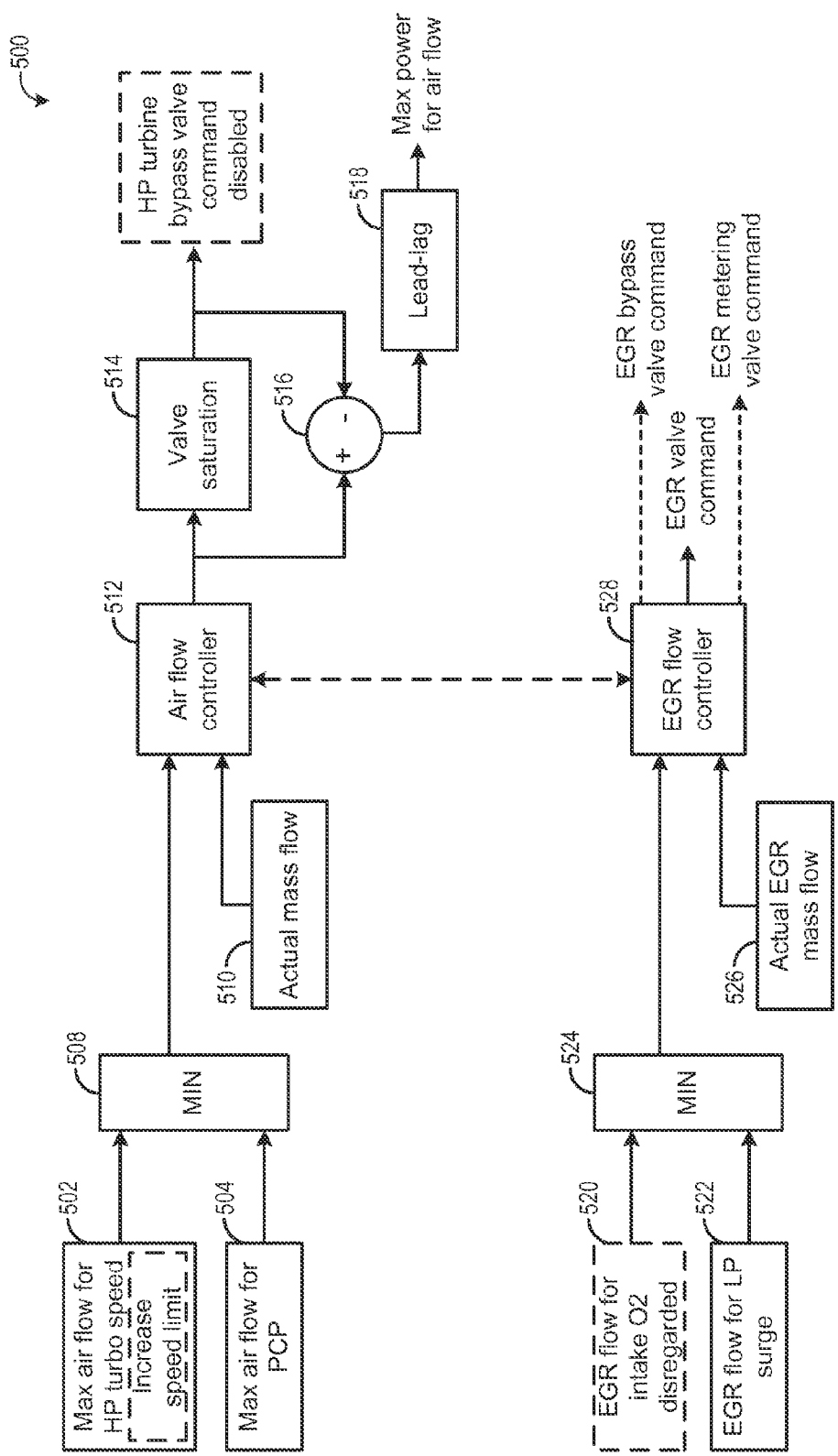
FIGS. 5A and 5B are diagrams illustrating control routines for determining turbine bypass valve and EGR valve position in response to degradation to a low-pressure turbocharger and a high-pressure turbocharger according to embodiments of the invention.
Figure 5B:
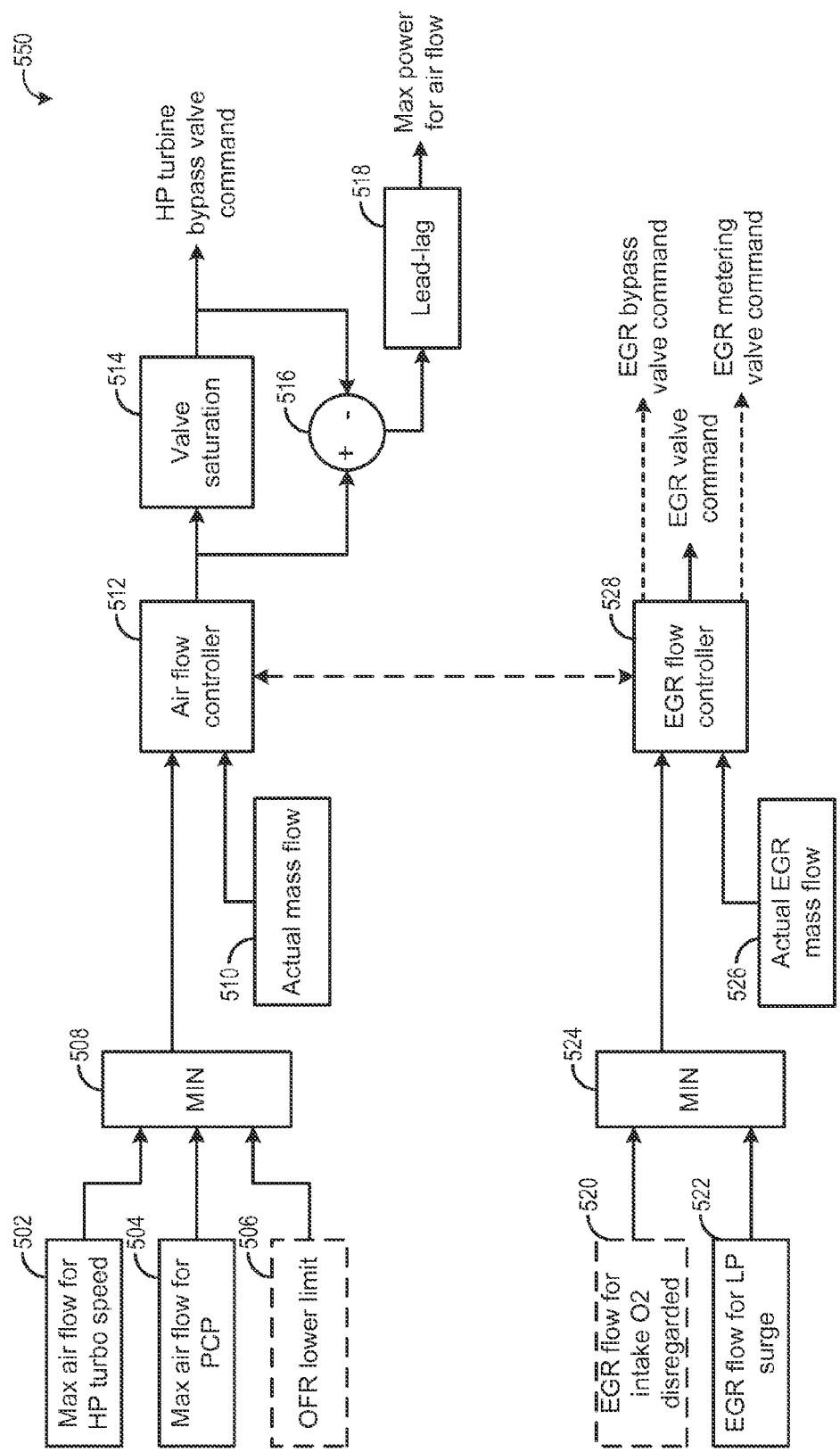

Turning to FIGS. 5A and 5B, they include diagrams illustrating adjustments to a control routine for determining a position of the HP turbine bypass valve and EGR valve or valves. FIG. 5A illustrates a control routine 500 for setting the position of the HP turbine bypass valve and EGR valves during operation with a degraded low-pressure turbocharger, while FIG. 5B illustrates a control routine 550 for setting the position of the HP turbine bypass valve and EGR valves during operation with a degraded high-pressure turbocharger. Routines 500 and 550 may be carried out by control unit 180 during the execution of method 400, for example. For each of routines 500 and 550, the actions undertaken during standard operation without a degraded turbocharger are illustrated in solid boxes, while the actions that have been added, removed, or otherwise adjusted in response to the detection of the turbocharger degradation are illustrated in dashed boxes.

Referring now to FIG. 5A, the position of the high-pressure turbine bypass valve is normally adjusted to provide a desired air flow for one or more operating parameters. These include, at 502, the maximum air flow for a desired high-pressure turbocharger speed. The desired high-pressure turbocharger speed may be a maximum turbocharger speed. The mass air flow for the maximum speed is a function of the current pressure ratio or compressor speed, and may be selected from a turbocharger flow map stored in the memory of the control unit. However, during operation with a degraded low-pressure turbocharger, this maximum speed for the high-pressure turbocharger is increased, to allow for maximum air flow through the high-pressure turbocharger.

At 504, the maximum air flow for peak combustion pressure is determined. The maximum air flow for peak combustion pressure may be the air flow amount in the intake manifold that results in a cylinder air volume that provides for a designated maximum pressure in the cylinder during compression and resultant combustion. The peak combustion pressure is also a function of fuel injection parameters such as fuel rail pressure, injection timing, and intake oxygen, and may also be a function of the cylinder compression ratio, intake manifold temperature, and maximum intake manifold pressure.

At 508, the minimum air flow amount from the maximum air flow for maximum turbocharger speed and maximum air flow for peak combustion pressure is selected as the designated air flow amount. By choosing the minimum air flow amount from among the two different air flow amounts, it is ensured that none of the considered operating parameters are operating above a maximum allowed air flow amount.

The air flow amount output from 508 is input to an air flow controller 512 along with the actual measured mass air flow 510. The air flow controller may be included as part of control unit 180, and may be utilized specifically to determine a position for the turbine bypass valve. In one example, the position of the turbine bypass valve may be based on the difference between the desired air flow amount output from 508 and the current air flow amount at 510. Other mechanisms for determining the position of the turbine bypass valve are also possible, such as including feed-forward control.

The air flow controller 512 outputs a commanded valve position signal to a valve saturation regulator 514. Under certain conditions, the air flow controller 512 may output a valve position that is not attainable due to the physical constraints of the valve, e.g., the valve can only be adjusted between its fully open and fully closed positions, and cannot be adjusted outside of these positions. For example, if the valve is fully open yet the air flow controller 512 is commanding the valve be open more to reduce air flow through the turbocharger, the valve saturation regulator 514 will output the valve to remain in its fully open position. However, if the air flow controller 512 commands the valve to a position between fully open and fully closed, the valve saturation regulator 514 outputs the same signal as the controller.

If the valve is already at a fully open or fully closed position and yet additional air flow adjustments are indicated, the air flow cannot be further adjusted by the turbine bypass valve. To compensate, engine output may be adjusted. The difference between the valve position commanded before and after the valve saturation regulator 514 is determined at 516, and this difference is input to a lead-lag regulator 518. If the difference between the valve positions is different than zero, the lead-lag regulator 518 outputs a signal to adjust engine output, such as horsepower, torque, etc., to bring the air flow to the desired air flow.

However, during operation with a degraded low-pressure turbine, the amount of air flow through the high-pressure turbocharger is maximized to minimize the flow and pressure exerted on the low-pressure turbocharger. Therefore, the turbine bypass valve position that is commanded from the air flow controller is disabled, and the valve is automatically commanded to the closed position.

Control routine 500 also determines the position an EGR valve, or in some embodiments, the position of an EGR metering valve and EGR bypass valve, which may be coordinately regulated to route a desired amount of exhaust from a subset of the cylinders (the donor cylinder group) to the intake and/or to the exhaust passage. To determine the EGR valve position, an EGR flow amount for designated intake oxygen is typically determined at 520. The EGR flow for designated intake oxygen may be determined based on engine speed, engine load, and OFR, in order to minimize exhaust emissions. Additionally, the EGR flow for designated intake oxygen may account for trapped in-cylinder oxygen amounts. The amount of oxygen trapped in the cylinders may be determined based on intake and exhaust valve timing, exhaust back pressure, and/or other parameters.

When the low-pressure turbocharger is degraded, however, the EGR flow amount is controlled to reduce the mass air flow through the turbochargers. Thus, when operating with a degraded low-pressure turbocharger, the EGR flow amount for designated intake oxygen is disregarded.

At 522, the maximum amount of EGR flow allowable without causing surge of the low-pressure turbocharger is determined. The maximum amount of EGR flow without surge is an amount of EGR that results in the minimum of amount of air flow for avoiding surge in the low-pressure turbocharger. The minimum air flow for avoiding surge is a function of the turbocharger speed. The minimum air flow amount may be determined based on a low-pressure turbocharger flow map. For example, the current turbocharger speed may be entered into the map and the air flow amount at or adjacent to the surge line for that speed determined. The turbocharger speed on the map may be a corrected turbocharger speed that takes into account the air temperature and pressure entering the turbocharger, and thus the minimum air flow selected from the map may be uncorrected in order to determine the actual minimum air flow amount. The maximum EGR amount may be determined by subtracting the minimum air flow amount from the current mass air flow.

When the system is operating with functional, non-degraded turbochargers, the EGR flow amount may be regulated to prevent surge of the low-pressure turbocharger, as explained above. However, when the low-pressure turbocharger is degraded, the EGR flow amount for avoiding surge is used as the reference EGR amount (discussed below), but the EGR is not adjusted if surge is detected at the low-pressure turbocharger. Rather, as explained previously, the engine power may be decreased to prevent surge of the low-pressure turbocharger.

At 524, the minimum EGR flow amount of the EGR flow for desired intake oxygen (which is disregarded when the low-pressure turbocharger is degraded) and the EGR flow for avoiding surge is selected as a reference EGR flow amount. When the minimum EGR flow amount from between the EGR flow for intake oxygen and the EGR flow for avoiding surge is selected, the EGR flow may be maintained below an amount that may cause surge in the low-pressure surge while providing desired emissions control under most conditions. When the low-pressure turbocharger is degraded, the EGR flow amount for avoiding surge is automatically selected as the reference EGR flow amount.

The reference EGR flow amount selected at 524 is input into an EGR flow controller 528 along with an actual measured EGR flow amount 526. Similar to the air flow controller 512, the EGR flow controller 528 may be part of control unit 180, and may determine the position of the EGR valve or valves in order to provide the desired EGR amount. In one example, the actual EGR flow may be subtracted from the reference EGR flow amount, and this difference, or error, between the actual and reference EGR amounts may be used by the EGR flow controller 528 to determine an adjustment to the EGR valve or valves. Further, in some embodiments, the EGR flow controller 528 and the air flow controller 512 may communicate with each other, and the position of the EGR valve or valves may be further based on the position of the turbine bypass valve, for example.

The EGR flow controller 528 outputs a command for the position of the EGR valve. In other embodiments, the EGR flow controller 528 may output a command for the position of the EGR bypass valve, which regulates the exhaust that is routed to the exhaust passage and to atmosphere, and a command for the position of the EGR metering valve, which regulates the routing of the exhaust back to the intake. The coordinated control of the EGR bypass and metering valves provides a desired EGR flow amount for controlling emissions, avoiding turbocharger surge, or reducing mass flow in response to a degraded turbocharger.

Referring now to FIG. 5B, the adjustments to the above routine for operation with a degraded high-pressure turbocharger are depicted in routine 550. The actions that are similar to the actions of routine 500 maintain the same reference characters as routine 500.

As explained above, the position of the turbine bypass valve is typically determined based on the minimum air flow selected from the air flow for maximum high-pressure turbocharger speed and the air flow for peak combustion pressure. When the high-pressure turbocharger is degraded, an additional control element is added. An oxygen-fuel ratio (OFR) lower limit 506 is entered into the air flow amount selection at 508. The engine may be commanded to operate at low OFR during operation with the degraded high-pressure turbocharger. By operating with a low OFR, the amount of charge air in the cylinders for combustion is reduced, thus lowering the air flow through the turbochargers. The OFR lower limit 506 may include the air flow amount that results in the low OFR.

The minimum of three air flow amounts determined at 502, 504, and 506 is selected at 508. Since the low OFR air flow amount is frequently the lowest air flow amount allowed by the engine, when the high-pressure turbocharger is degraded, this amount will be selected as the air flow amount. The position of the turbine bypass valve is then determined by inputting the minimum air flow amount to the air flow controller 512, as explained with respect to FIG. 5A.

For determining the position of the EGR valve or valves, the routine is similar to the routine for determining the position of the EGR valves with low-pressure turbocharger degradation. However, the EGR flow amount for providing designated intake oxygen at 520 is disregarded, and the reference EGR flow amount is set to the EGR flow amount for avoiding surge, as indicated at 522. If the low-pressure turbocharger is driven to surge, surge mitigation may be undertaken by adjusting engine output rather than EGR flow amounts.

Thus, the systems and methods described herein provide for a method for an engine. The method comprises reducing mass flow through a first turbocharger while continuing engine operation and adjusting operation of a second turbocharger in response to detected degradation of the first turbocharger. The first and second turbochargers may be arranged in series, the first turbocharger may be operably coupled to the second turbocharger. The mass flow through the second turbocharger may be increased to adjust the operation of the second turbocharger. To reduce the mass flow through the first turbocharger, an amount of exhaust gas recirculation (EGR) routed to an intake of the engine may be increased. In other embodiments, the mass flow through the first turbocharger may be reduced by decreasing engine load and/or by adjusting a turbine bypass valve of one of the first or second turbochargers.

The first and second turbochargers may include a high-pressure turbocharger configured to operate in a region of relatively higher pressure, and a low-pressure turbocharger configured to operate in a region of relatively lower pressure. In one embodiment, the first turbocharger may be a high-pressure turbocharger, and the second turbocharger may be a low-pressure turbocharger. The turbine bypass valve of the high-pressure turbocharger may be opened to reduce flow through the high-pressure turbocharger in response to degradation of the high-pressure turbocharger. In other embodiments, the first turbocharger may be a low-pressure turbocharger and the second turbocharger may be a high-pressure turbocharger, and the turbine bypass valve of the high-pressure turbocharger may be closed to increase flow through the high-pressure turbocharger and reduce flow through the low-pressure turbocharger in response to degradation of the low-pressure turbocharger.

In some embodiments, the degradation of the first turbocharger may be detected based on feedback from a sensor coupled to the first turbocharger. The sensor may communicate with a control system, and the control system may determine if the sensor feedback indicates turbocharger degradation, and adjust the turbocharger operating conditions accordingly. In other embodiments, the degradation may be detected by a sensor not coupled to the turbocharger, such as a crankcase pressure sensor. In embodiments, the amount of EGR routed to the intake may be increased to avoid an over speed event of the low-pressure turbocharger.

An embodiment relates to a method for an engine, e.g., a method for controlling an engine. The method comprises, in response to detected degradation of a first turbocharger coupled to the engine, controlling the following: reducing mass flow through the first turbocharger; continuing engine operation; and adjusting operation of a second turbocharger coupled to the engine. In another embodiment, the mass flow is reduced, engine operation is continued, and operation of the second turbocharger is adjusted, all at least partially concurrently (some overlap in time).

Another embodiment relates to a method for an engine, e.g., a method for controlling an engine. The method comprises receiving information about a type and degree of degradation of a two-stage turbocharger system operably coupled to the engine. For example, the two-stage turbocharger system may include a first turbocharger stage, and a second turbocharger stage operably coupled to the first turbocharger stage. Thus, in one embodiment, the received information is about a type and degree of degradation of the first turbocharger stage. The method further comprises adjusting operation of the engine and two-stage turbocharger system based at least in part on the received information. The method may further comprise receiving sensor information from one or more sensors associated with the two-stage turbocharger system, which is indicative of the type and/or degree of degradation, and communicating the information about the type and degree of the degradation of the two-stage turbocharger system.

In some embodiments, the type of degradation may include a cracked turbine casing or loss of oil pressure and/or flow. In such circumstances, engine operation may be terminated upon detection of the degradation to prevent further engine and turbocharger degradation. In other embodiments, the degradation may include an out of balance rotor assembly or thrust bearing failure. In such circumstances, engine operation may continue, and the load on the degraded stage of the turbocharger shifted to the non-degraded stage. The continued engine operation may be limited to reduce system mass flow through the two-stage turbocharger. The adjusted engine operation may include increasing EGR flow to the intake, reducing engine output, and/or adjusting fuel injection parameters, such as timing or quantity. To shift the load from the degraded to the non-degraded stage of the turbocharger, a turbine bypass valve may be adjusted.

Another embodiment relates to an engine system. The engine system comprises a two-stage turbocharger system and a control unit. The control unit is configured to, if degradation is detected in a first stage of the two-stage turbocharger system, then reduce mass air flow through the first stage while continuing operation of a second stage of the two-stage turbocharger system. The degradation of the first stage may be detected via a sensor, such as an accelerometer configured to detect vibrations of the two-stage turbocharger system. The degradation may be detected based on a change of detected vibrations of the turbocharger.

In one embodiment, a turbine bypass valve may be associated with the first stage. The control unit may include further instructions to open the turbine bypass valve to reduce the mass flow through the first stage. In other embodiments, the turbine bypass valve may be associated with the second stage. The control unit may include further instructions to close the turbine bypass valve to reduce the mass flow through the first stage. Closing the turbine bypass valve increases flow through the second stage, and thus an upper limit of flow through the second stage may be increased.

The control unit may include further instructions to open an EGR metering valve and close an EGR bypass valve of an EGR system to further decrease mass flow through the first stage.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, comprising:
reducing mass flow through a first turbocharger while continuing engine operation and adjusting operation of a second turbocharger in response to detected degradation of the first turbocharger, said detected degradation determined at least in part by readings obtained through a plurality of sensors, with at least one of the sensors located within a housing of either the first or second turbocharger.

2. A method for an engine, comprising:
reducing mass flow through a first turbocharger while continuing engine operation and adjusting operation of a second turbocharger in response to detected degradation of the first turbocharger,
wherein reducing the mass flow through the first turbocharger further comprises increasing an amount of exhaust gas recirculation (EGR) routed to an intake of the engine, and wherein adjusting operation of the second turbocharger further comprises increasing mass flow through the second turbocharger, wherein the first and second turbochargers are arranged in series.

3. The method of claim 1, wherein reducing the mass flow through the first turbocharger further comprises adjusting a turbine bypass valve of one of the first or second turbochargers.

4. The method of claim 1, wherein reducing the mass flow through the first turbocharger further comprises reducing engine load.

5. The method of claim 1, further comprising detecting degradation of the first turbocharger based on feedback from a sensor coupled to the first turbocharger.

6. A method for an engine, comprising:
detecting degradation of a first turbocharger based on crankcase pressure; and
reducing mass flow through the first turbocharger while continuing engine operation and adjusting operation of a second turbocharger in response to the detected degradation of the first turbocharger.

7. The method of claim 1, wherein the first turbocharger is a high-pressure turbocharger, and wherein reducing the mass flow comprises opening a turbine bypass valve of the high-pressure turbocharger to reduce the mass flow through the high-pressure turbocharger.

8. A method for an engine, comprising:
reducing mass flow through a first turbocharger while continuing engine operation and adjusting operation of a second turbocharger in response to detected degradation of the first turbocharger, wherein the first turbocharger is a low-pressure turbocharger and the second turbocharger is a high-pressure turbocharger, and wherein adjusting operation of the second turbocharger comprises closing a turbine bypass valve of the high-pressure turbocharger to increase flow through the high-pressure turbocharger, and further comprising increasing an amount of EGR routed to an intake of the engine to prevent an over speed event of the low-pressure turbocharger.

9. A method for an engine, comprising:
adjusting operation of a two-stage turbocharger system and the engine based on a type and degree of degradation to a first stage of the two-stage turbocharger system, said degree of degradation determined at least in part by readings obtained through a plurality of sensors, with at least one of the sensors located within a housing of either a first turbocharger of the two-stage turbocharger system or a second turbocharger of the two-stage turbocharger system.

10. The method of claim 9, wherein if the degradation comprises a cracked turbine casing or loss of oil pressure and/or flow, then adjusting operation of the engine comprises terminating engine operation.

11. The method of claim 9, wherein adjusting engine operation further comprises derating engine output.

12. The method of claim 9, wherein adjusting engine operation further comprises increasing an amount of EGR routed to an intake of the engine.

13. The method of claim 9, wherein adjusting engine operating further comprises adjusting fuel injection.

14. The method of claim 9, wherein adjusting engine operation further comprises reducing engine load.

15. The method of claim 9, wherein adjusting operation of the two-stage turbocharger system further comprises opening a bypass valve of the first stage of the two-stage turbocharger system.

16. The method of claim 9, wherein adjusting operation of the two-stage turbocharger system further comprises closing a bypass valve of a second stage of the two-stage turbocharger system.

17. An engine system, comprising:
a two-stage turbocharger system; and
a control unit configured to:
if degradation is detected in a first stage of the two-stage turbocharger system, then reduce mass flow through the first stage while continuing operation of a second stage of the two-stage turbocharger system, said detected degradation determined at least in part by readings obtained through a plurality of sensors, with at least one of the sensors located within a housing of either the first stage or the second stage.

18. The engine system of claim 17, wherein the first stage is a high-pressure stage, and wherein the control unit is further configured to open a high-pressure turbine bypass valve of the high-pressure stage to reduce the mass flow through the high-pressure stage.

19. The engine system of claim 17, wherein the first stage is a low-pressure stage and the second stage is a high-pressure stage, and wherein the control unit is further configured to close a high-pressure turbine bypass valve of the high-pressure stage to reduce the mass flow through the low-pressure stage.

20. The engine system of claim 19, wherein the control unit is further configured to increase an upper limit of mass flow through the high-pressure stage.

21. The engine system of claim 17, wherein the control unit is further configured to open an EGR metering valve and close an EGR bypass valve of an EGR system to increase an EGR amount routed to an engine intake and reduce the mass flow through the first stage.

22. The engine system of claim 17, further comprising a sensor coupled to the two-stage turbocharger system to detect the degradation of the first stage.

23. The engine system of claim 22, wherein the sensor comprises an accelerometer configured to detect vibrations of the two-stage turbocharger system, and wherein the control unit is further configured to detect the degradation based on a change of the detected vibrations of the two-stage turbocharger system.

* * * * *